United States Patent Office 2,915,497
Patented Dec. 1, 1959

2,915,497

SOLVENTLESS SILOXANE RESINS

Harold A. Clark, Midland, Mich., assignor to Dow Corning Corporation, Midland, Mich., a corporation of Michigan No Drawing. Application November 29, 1956
Serial No. 624,975

6 Claims. (Cl. 260—46.5)

This invention relates to vinyl containing siloxane solventless resins.

Prior to this invention the best commercially available siloxane solventless resin system consisted of mixtures of vinylsiloxanes and peroxide curing catalysts. There are two main variations in this system. In one, the peroxide catalysts were employed with a high molecular weight vinylsiloxane. In the other, the peroxide catalyst was used with mixtures of a high molecular weight vinylsiloxane and a low molecular weight vinylsiloxane which acted as a reactive diluent. These solventless resins have proved to be useful for many applications but they suffer from several disadvantages, the most serious of which is the phenomenon known as air inhibition. That is, the surface of the resin would not cure satisfactorily when exposed to air. This meant that if the resin were cured in the open the surface tended to remain tacky. It also meant that the above-described resins are not suitable for use as protective coatings or electrical varnishes which are to be cured in contact with air.

The value of employing a solventless resin over conventional siloxane resins is that the solventless resin can be cured in deep section without the formation of voids. Furthermore, the solventless resin is more desirable for the impregnation of intricate apparatus since one does not thereafter have to remove the solvent before curing the resin. For these reasons, a solventless siloxane resin which does not suffer from air inhibition is highly desirable.

It is the object of this invention to provide a novel organosiloxane composition which is capable of curing in air and which possesses the desirable features of previously employed siloxane resins.

Another object is to provide a siloxane solventless resin having a wider range of properties, better physical strength and giving less discoloration on heating than previously known siloxane solventless resins. Other objects and advantages will be apparent from the following description.

This invention relates to a curable siloxane composition comprising a mixture of (1) a liquid siloxane having a viscosity of less than 60 cs. at 25° C. and having at least two SiH groups per molecule and at least one radical selected from the group consisting of phenyl, xenyl, phenylene and xenylene groups per molecule, in which siloxane any remaining organic groups in the compound are methyl, and (2) a polysiloxane containing from 15 to 60 mol percent vinylsiloxane units, said polysiloxane having an average of at least 8 silicon atoms per molecule, having a phenyl to silicon ratio of from .25:1 to 1.75:1 and having an average of at least one hydrocarbon group per silicon atom, in which polysiloxane (2) the hydrocarbon groups are selected from the group consisting of methyl, phenyl and vinyl radicals, siloxanes (1) and (2) being present in amount such that the ratio of the number of SiH groups in (1) to the vinyl groups in (2) is from .4:1 to 2:1.

The siloxane mixtures of this invention are cured by mixing them with a platinum catalyst and then heating at temperatures ranging from 50 to 110° C. or above. The amount of platinum catalyst employed is not critical and may range as low as 1 part per million of platinum based on the total weight of siloxanes (1) and (2). The platinum catalyst can be metallic platinum, preferably in a finely divided form such as platinum suspended on charcoal, or platinum salts such as chloroplatinic acid, platinic chloride, platinic sulfate and the like.

Siloxane (1) of this invention should be a fluid material having a viscosity of less than 60 cs. at 25° C. This siloxane serves a dual function. In the first place, it acts together with the platinum as a curing agent for the siloxane (2) and secondly, it acts as a diluent for siloxane (2) thereby rendering the mixture generally less viscous than the base resin (2). This improves the handling properties of the mixture and makes it easier to impregnate intricate apparatus and to cast the resin mixture in any desired form.

Any liquid siloxane fitting the above definition can be employed as siloxane (1). At least one of the organic groups in the molecule must be an aryl radical or the diluent (1) is not compatible with the base resin (2). Furthermore, each molecule must have at least two SiH groups or else it will not act as a curing agent. It is immaterial whether the molecules of (1) are linear, cyclic or branched in structure. Specific examples of siloxane (1) which are operative in this invention are Me₂HSiOSiPhMeH, MePh₂SiOSiMeH₂

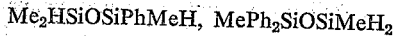
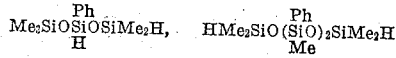
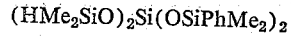

(HMe₂SiO)₂Si(OSiPhMe₂)₂

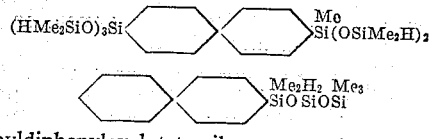

dimethyldiphenylcyclotetrasiloxane and tetramethyldiphenylcyclotetrasiloxane.

Polysiloxane (2) must have from 15 to 60 mol percent vinylsiloxane. The term vinylsiloxane includes any siloxane unit having at least one vinyl group attached to the silicon. In addition, in order to obtain satisfactory physical properties the base siloxane resin (2) should have an average of at least 8 silicon atoms per molecule. There is no critical upper limit to the degree of polymerization of siloxane (2). In order to obtain satisfactory physical properties it is necessary that siloxane (2) contain an average of from .25 to 1.75 phenyl radicals per silicon atom.

The siloxane (2) can consist of any copolymer of the following siloxane units arranged in any proportion which do not exceed the above critical limits. The units are monovinylsiloxane, divinylsiloxane, phenylvinylsiloxane, methylvinylsiloxane, trivinylsiloxane, divinylmethylsiloxane, divinylphenylsiloxane, monovinyldimethylsiloxane, monovinyldiphenylsiloxane, monovinylphenylmethylsiloxane, monomethylsiloxane, dimethylsiloxane, monophenylsiloxane, diphenylsiloxane, phenylmethylsiloxane, trimethylsiloxane, dimethylphenylsiloxane, methyldiphenylsiloxane, triphenylsiloxane and SiO₂ units.

In order to obtain superior physical properties and thermal stability in the cured resins the ratio of the number of SiH groups to vinyl groups in the mixture of (1) and (2) should be from .4:1 to 2:1. Preferably this ratio should be from .8:1 to 1.2:1. When the ratio of SiH groups to vinyl is less than .4:1 unsatisfactory curing of the resins results. When the ratio of SiH to vinyl is above 2:1, preferably 1.2:1, inferior thermal stability results. This is presumably due to the oxidation of the excess SiH groups during heating.

It is believed that the curing of the siloxanes of this invention is due to the addition of the SiH group to the vinyl group in accordance with the equation $$\equiv SiH + CH_2=CHSi\equiv \rightarrow \equiv SiCH_2CH_2Si\equiv.$$

The siloxane compositions of this invention can be plasticized if desired with low molecular weight phenylvinylsiloxanes which have an average of less than 8 silicon atoms per molecule. For example, they can be plasticized by the addition of symmetrical divinyldimethyldiphenyldisiloxane and other similar materials such as those described in the copending application of Harold A. Clark, Serial Number 598,264, filed July 17, 1956. This plasticizing action is particularly important when base resin (2) is so viscous that it is not sufficiently plasticized by the required amount of (1) to be easily handled. For example, if base resin (1) is a copolymer of monovinylsiloxane and monophenylsiloxane, the material is solid at room temperature and remains extremely viscous even when the required amount of siloxane (1) is added. In such cases it is desirable to incorporate in the mixture a low molecular weight vinylsiloxane such as those described in the Clark application supra. In all cases where the vinyl plasticizer is employed, the amount of siloxane (1) used should be sufficient so that the amount of SiH relative to the total vinyl in both (2) and the plasticizer should fall within the range of .4:1 to 2:1.

If desired, the resins of this invention can also be plasticized with other materials such as low molecular weight phenylmethylsiloxanes or other siloxanes compatible with the resin or they can be plasticized with heat stable organic materials compatible with the resin.

If desired, any heat stable filler can be incorporated in the resins of this invention. Fillers are often advantageously employed to improve specific properties such as impact strength, coefficient of expansion, or to improve the stress-strain properties of the resin. Suitable fillers include, for example, glass fibers, finely divided silica, sand, clays, powdered glass, asbestos, carbon black and metallic oxides such as iron oxide, $TiO_2$, MgO and the like.

When the resins of this invention are to be employed in uses which require curing in deep section, it is desirable that they be essentially free of SiOH groups. The presence of these groups giving bubbling caused by the interaction of SiH with the SiOH. This interaction is immaterial where the resins are to be employed as coating materials in the form of relatively thin films but it is undesirable in other applications. The base resins (2) are best freed from silicon bonded hydroxyls by heating them in solution in the presence of an alkaline catalyst such as alkali metal hydroxides or their equivalents.

The resins of this invention can be employed in the conventional manner for coating, casting and impregnating. In general, the siloxanes (1) and (2) are mixed with the platinum catalyst together with any desired filler and the resulting mixture is then fabricated into the desired form and cured by heating. As stated above, the curing will occur at temperatures at 50 to 110° C. but it is often desirable to give the cured resin an after-bake in order to improve the physical properties. These afterbakes may be carried out at temperatures ranging up to 200° C. or above.

The compositions of this invention are particularly useful for impregnating, encapsulating and potting electrical equipment, for coating electrical conductors and for use as protective coatings for metal and other surfaces.

The compositions of this invention can contain any other desirable additives such as pigments, oxidation inhibitors and the like.

The following examples are illustrative only and should not be construed as limiting the invention which is properly delineated in the appended claims.

All of the base resins employed in the following examples had an average of more than 8 silicon atoms per molecule.

Example 1

45 g. of a base resin comprising a copolymer of 33 mol percent monovinylsiloxane, 33 mol percent monophenylsiloxane, 17 mol percent phenylvinylsiloxane and 17 mol percent phenylmethylsiloxane were mixed with 28 g. of $$HMe_2SiOSiOSiMe_2H \atop Ph_3$$

(giving an SiH to vinyl ratio of .87) and a solution of chloroplatinic acid in the dimethylether of diethylene glycol in amount to give about 2 parts per million by weight platinum based on the total weight of the siloxanes. The mixture was cast into a bar ⅛″ thick and then cured by heating 16 hours at 110° C., 4 hours at 150° C., and 24 hours at 200° C. The resulting bar had a tensile strength of 2100 p.s.i., a flexural strength of 5000 p.s.i., a light transmission of 93% and a haze of .86%.

Example 2

150 g. of a base resin comprising a copolymer of 25 mol percent monomethylsiloxane, 25 mol percent monophenylsiloxane and 50 mol percent phenylvinylsiloxane were mixed with 102 g. of $$HMe_2SiOSiOSiMe_2H \atop Ph_3$$

(SiH to vinyl ratio of 1) and the catalyst of Example 1 in amount to give 6 parts per million by weight platinum based on the total weight of the siloxanes. The mixture was cast into a bar ½″ thick and cured 16 hours at 85° C., 8 hours at 150° C. and 24 hours at 200° C. The resulting bar had a tensile strength of 2750 p.s.i., a flexural strength of 5800 p.s.i., and an impact strength of .42 foot lbs. as measured by the Izod test of the American Society of Testing Materials No. D256–54T.

Example 3

45 g. of a base resin comprising a copolymer of 50 mol percent methylvinylsiloxane and 50 mol percent monophenylsiloxane were mixed with 35 g. of $$HMe_2SiOSiOSiMe_2H \atop Ph_3$$

(SiH to vinyl ratio of 1) and the catalyst of Example 1 in amount to give 6 parts per million by weight platinum based on the total weight of the siloxanes. The mixture was then cured for 16 hours at 110° C., 8 hours at 150° C., and 16 hours at 200° C. to give a hard resin.

Example 4

180 g. of a base resin comprising a copolymer of 50 mol percent diphenylsiloxane and 50 mol percent phenylvinylsiloxane were mixed with 57 g. of $PhSi(OSiMe_2H)_3$ (SiH to vinyl ratio of 1) and a solution of chloroplatinic acid in dimethyl phthalate in amount to give 4 to 5 parts per million by weight platinum based on the total weight of the siloxanes. The mixture was cast into a bar and cured 16 hours at 110° C., 8 hours at 150° C., and 96 hours at 200° C. The resulting material was tough and flexible and had a flexural strength of 5500 p.s.i.

Example 5

90 g. of a base resin comprising a copolymer of equimolar proportions of monophenylsiloxane, monovinylsiloxane and phenylmethylsiloxane were mixed with 10 g. of symmetrical diphenyldimethyldivinyldisiloxane, 19.5 g. of symmetrical diphenyldimethyldisiloxane (SiH to vinyl ratio of .48) and the catalyst of Example 4 in amount to give 2 parts per million by weight platinum based on the total weight of the siloxanes. The resulting material was cured at 110° C. and then heated 20 hours at 200° C. to give a hard, tough resin.

*Example 6*

51 g. of a base resin comprising a copolymer of 40 mol percent monovinylsiloxane, 30 mol percent monophenylsiloxane, and 30 mol percent phenylmethylsiloxane were mixed with 13 g. of symmetrical tetramethyldivinyldiphenyltrisiloxane, 29 g. of

(SiH to vinyl ratio of 1) and the catalyst of Example 4 in amount to give 2 parts per million by weight platinum based on the total weight of the siloxanes. The resulting resin was cured 16 hours at 110° C., and 72 hours at 150° C. to give a brittle resin.

*Example 7*

18 g. of a base resin comprising a copolymer of 25 mol percent diphenylsiloxane, 25 mol percent monophenylsiloxane and 50 mol percent phenylvinylsiloxane were mixed with 12 g. of a 15 cs. fluid having the general molecular formula

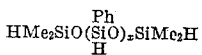

(SiH to vinyl ratio of 2) and the catalyst of Example 4 in amount to give 10 parts per million by weight platinum based on the total weight of the siloxanes. The resulting mixture was cured 18 hours at 150° C. to give a tough, flexible resin.

*Example 8*

Equivalent results are obtained when a base resin comprising a copolymer of 40 mol percent monovinylsiloxane, 30 mol percent monophenylsiloxane, 20 mol percent phenylmethylsiloxane and 10 mol percent dimethylsiloxane is mixed with the compound

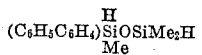

in amount so that the ratio of SiH to vinyl groups is 1 and with a suspension of platinum on charcoal in amount to give 20 parts per million by weight platinum based on the total weight of the siloxanes and the mixture is thereafter cured 24 hours at 150° C.

*Example 9*

Equivalent results are obtained when a base resin comprising a copolymer of .2 mol percent vinyldimethylsiloxane, 49.8 mol percent phenylvinylsiloxane and 50 mol percent phenylmethylsiloxane is mixed with symmetrical dimethyldiphenyldisiloxane in amount such that the SiH to vinyl ratio is 1 and with the catalyst of Example 1 in amount to give 6 parts per million by weight platinum based on the total weight of the siloxanes and the mixture is thereafter cured 24 hours at 150° C.

*Example 10*

Equivalent results are obtained when a base resin comprising a copolymer of 5 mol percent divinylsiloxane, 40 mol precent phenylvinylsiloxane, 1 mol percent phenyldimethylsiloxane and 54 mol percent phenylmethylsiloxane is mixed with the cyclic tetramer (PhHSiO)$_4$ in amount such that the SiH to vinyl ratio is 1 and with the catalyst of Example 1 in amount to give 6 parts per million by weight platinum based on the total weight of the siloxanes and the mixture thereafter cured 24 hours at 150° C.

That which is claimed is:

1. A composition of matter capable of curing at elevated temperature comprising (1) a liquid siloxane having a viscosity of less than 60 cs. to 25° C., at least two SiH groups per molecule and at least one radical per molecule attached to silicon by a silicon-carbon bond and selected from the group consisting of phenyl, xenyl, phenylene and xenylene groups, in said siloxane any remaining valences of the silicon atoms being satisfied by methyl radicals and (2) a polysiloxane containing from 15 to 60 mol percent vinylsiloxane, said polysiloxane having an average of at least 8 silicon atoms per molecule, a phenyl to silicon ratio of from .25:1 to 1.75:1 and having on the average of at least one hydrocarbon group per silicon atom attached by a silicon-carbon bond, the hydrocarbon groups in said polysiloxane being selected from the group consisting of methyl, phenyl and vinyl radicals, siloxanes (1) and (2) being present in amount such that the ratio of the number of SiH groups in (1) to the vinyl groups in (2) is from .4:1 to 2:1.

2. A composition of matter capable of curing at elevated temperature comprising (1) a liquid siloxane having a viscosity of less than 60 cs. at 25° C., at least two SiH groups per molecule and at least 1 radical per molecule attached to silicon by a silicon-carbon bond and selected from the group consisting of phenyl, xenyl, phenylene and xenylene groups, in said siloxane any remaining valences of the silicon atoms being satisfied by methyl radicals, (2) a polysiloxane containing from 15 to 60 mol percent vinylsiloxane, said polysiloxane having an average of at least 8 silicon atoms per molecule, a phenyl to silicon ratio of from .25:1 to 1.75:1 and having on the average of at least one hydrocarbon group per silicon atom attached by a silicon-carbon bond, the hydrocarbon groups in said polysiloxane being selected from the group consisting of methyl, phenyl and vinyl radicals, siloxanes (1) and (2) being present in amount such that the ratio of the number of SiH groups in (1) to the vinyl groups in (2) is from .4:1 to 2:1 and (3) a platinum catalyst.

3. A composition of matter capable of curing at elevated temperature comprising (1) a liquid siloxane having a viscosity of less than 60 cs. at 25° C., at least two SiH groups per molecule and at least one radical per molecule attached to silicon by a silicon-carbon bond and selected from the group consisting of phenyl, xenyl, phenylene and xenylene groups, in said siloxane any remaining valences of the silicon atoms being satisfied by methyl radicals and (2) a polysiloxane containing from 15 to 60 mol percent vinylsiloxane, said polysiloxane having an average of at least 8 silicon atoms per molecule, a phenyl to silicon ratio of from .25:1 to 1.75:1 and having on the average of at least one hydrocarbon group per silicon atom attached by a silicon-carbon bond, the hydrocarbon groups in said polysiloxane being selected from the group consisting of methyl, phenyl and vinyl radicals, siloxanes (1) and (2) being present in amount such that the ratio of the number of SiH groups in (1) to the vinyl groups in (2) is from .8:1 to 1.2:1.

4. A composition of matter capable of curing at elevated temperature comprising (1) a liquid siloxane having a viscosity of less than 60 cs. at 25° C., at least two SiH groups per molecule and at least one radical per molecule attached to silicon by a silicon-carbon bond and selected from the group consisting of phenyl, xenyl, phenylene and xenylene groups, in said siloxane any remaining valences of the silicon atoms being satisfied by methyl radicals, (2) a polysiloxane containing from 15 to 60 mol percent vinylsiloxane, said polysiloxane having an average of at least 8 silicon atoms per molecule, a phenyl to silicon ratio of from .25:1 to 1.75:1 and having on the average of at least one hydrocarbon group per silicon atom attached by a silicon-bonded carbon, the hydrocarbon groups in said polysiloxane being selected from the group consisting of methyl, phenyl and vinyl radicals, siloxanes (1) and (2) being present in amount such that the ratio of the number of SiH groups in (1) to the vinyl groups in (2) is from .8:1 to 1.2:1 and (3) a platinum catalyst.

5. A heat curable composition of matter comprising (1) a liquid phenylsiloxane having a viscosity of less than 60 cs. at 25° C. and having at least two SiH groups per molecule, any remaining valences of the silicon atoms in said siloxane being satisfied by methyl radicals and (2) a polysiloxane containing from 15 to 60 mol percent vinylsiloxane, said polysiloxane having an average of at least 8 silicon atoms per molecule, a phenyl to silicon ratio of from .25:1 to 1.75:1 and an average of at least one hydrocarbon group per silicon atom attached by a silicon-carbon bond, the hydrocarbon groups in said polysiloxane being selected from the group consisting of methyl, phenyl and vinyl radicals, siloxanes (1) and (2) being present in amount such that the ratio of the number of SiH groups in (1) to the vinyl groups in (2) is from .8:1 to 1.2:1.

6. A heat curable composition of matter comprising (1) a liquid phenylsiloxane having a viscosity of less than 60 cs. at 25° C. and having at least two SiH groups per molecule, any remaining valences of the silicon atoms in said siloxane being satisfied by methyl radicals, (2) a polysiloxane containing from 15 to 60 mol percent vinylsiloxane, said polysiloxane having an average of at least 8 silicon atoms per molecule, a phenyl to silicon ratio of from .25:1 to 1.75:1 and an average of at least one hydrocarbon group per silicon atom attached by a silicon-carbon bond, the hydrocarbon groups in said polysiloxane being selected from the group consisting of methyl, phenyl and vinyl radicals, siloxanes (1) and (2) being present in amount such that the ratio of the number of SiH groups in (1) to the vinyl groups in (2) is from .8:1 to 1.2:1 and (3) a platinum catalyst.

References Cited in the file of this patent

UNITED STATES PATENTS

| | | |
|---|---|---|
| 2,637,738 | Wagner | May 5, 1953 |
| 2,728,692 | Dennett | Dec. 27, 1955 |

UNITED STATES PATENT OFFICE
CERTIFICATE OF CORRECTION

Patent No. 2,915,497                                                   December 1, 1959

Harold A. Clark

It is hereby certified that error appears in the printed specification of the above numbered patent requiring correction and that the said Letters Patent should read as corrected below.

Column 5, line 71, for "to $25°$ C." read -- at $25°$ C. --; column 6, line 65, for "silicon-bonded carbon" read -- silicon-carbon bond --; column 7, line 7, for "polysilioxane" read -- polysiloxene --.

Signed and sealed this 10th day of May 1960.

(SEAL)
Attest:

KARL H. AXLINE                                                     ROBERT C. WATSON
Attesting Officer                                            Commissioner of Patents